Nov. 3, 1936. E. S. CLARK 2,059,775
SEALING DEVICE
Filed Feb. 4, 1932 2 Sheets-Sheet 1
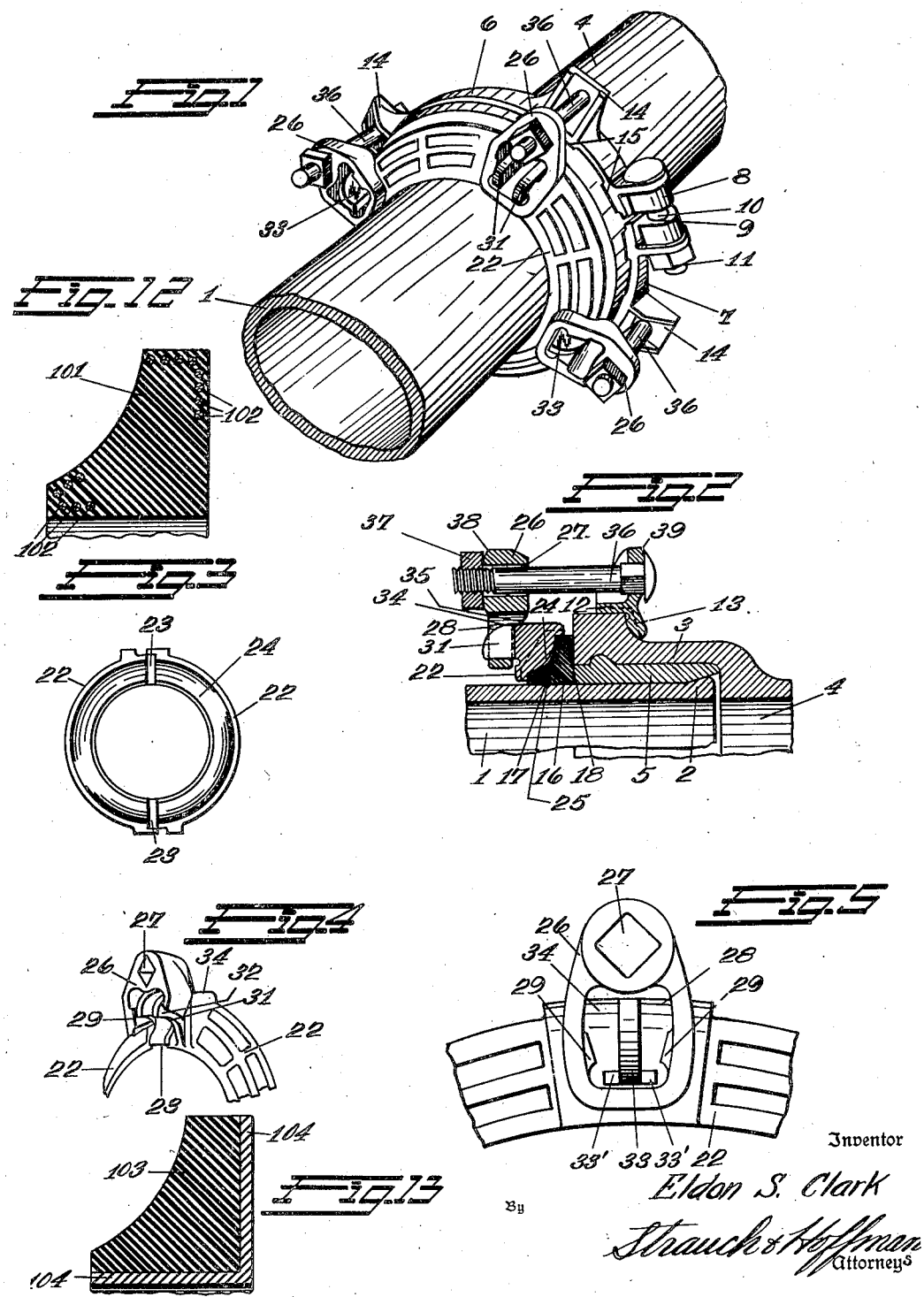
Inventor
Eldon S. Clark
By Strauch & Hoffman
Attorneys

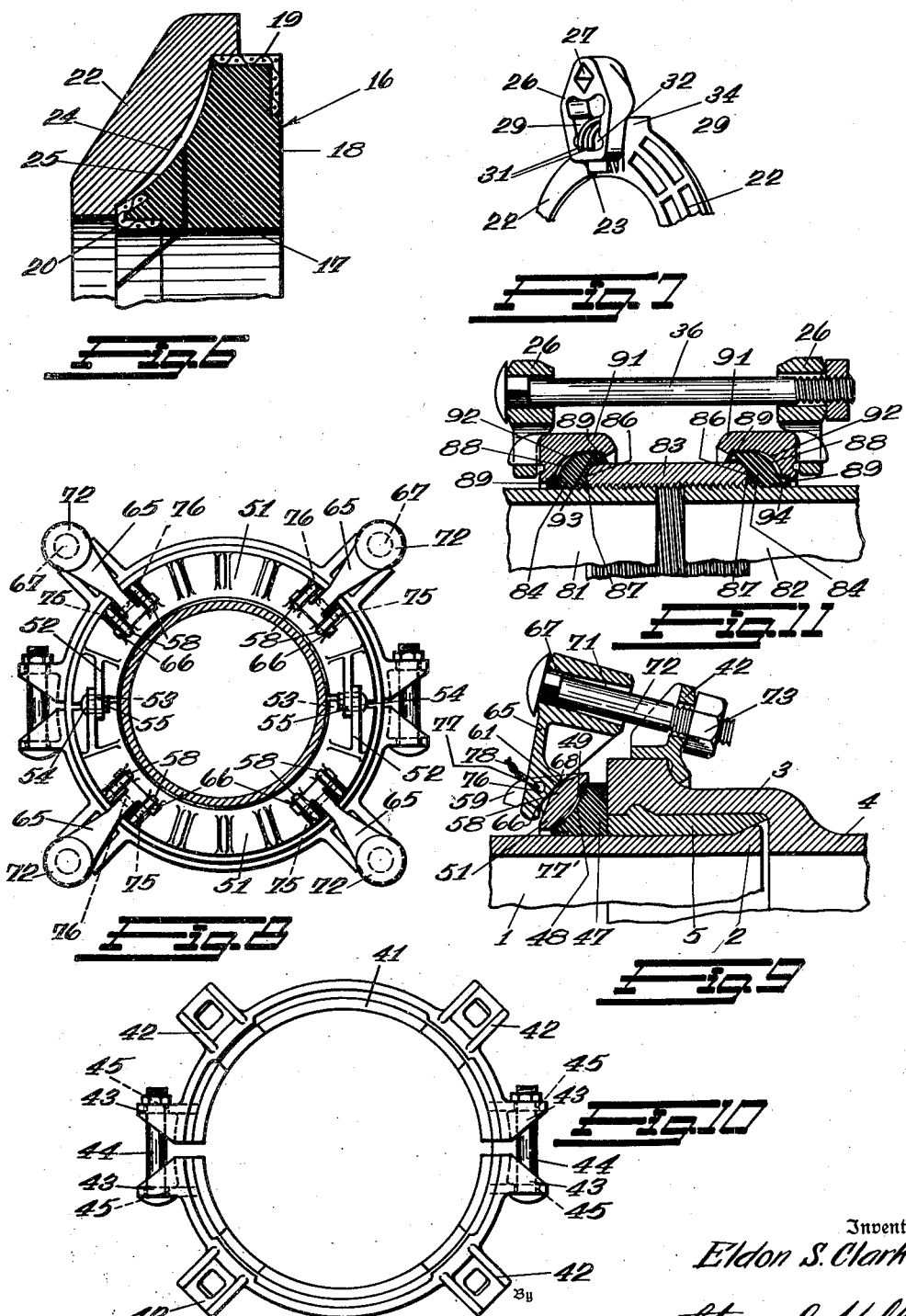

Patented Nov. 3, 1936

2,059,775

UNITED STATES PATENT OFFICE 2,059,775

SEALING DEVICE

Eldon S. Clark, Detroit, Mich., assignor to Timken-Michigan Company, Detroit, Mich., a corporation of Michigan Application February 4, 1932, Serial No. 590,935

19 Claims. (Cl. 285—119)

The present invention relates to sealing or leak preventing devices or clamps for pipe lines.

More particularly my invention is directed to a device for preventing the leakage of fluids through defective bell and spigot and like pipe joints, while at the same time permitting expansion and contraction of the pipe with temperature changes by relative movement of the pipe sections at the joints.

One wide field of use of such devices is in the gas industry. As is well known pipe lines carrying manufactured gas at comparatively low pressures are comparatively free from excessive gas loss due to leaky joints, due to the presence of tarry and gummy substances in the gas as it leaves the manufacturing plant, which condense or settle out of the gas and deposit in the lines forming a fairly good seal against the leakage of gas under low pressure distribution conditions.

Natural gas, however, does not contain substances that tend to seal the joints, and has the property of absorbing such sealing substances, so that on new natural gas lines or when natural gas is turned into existing manufactured gas distribution lines, unless special seals are provided large quantities of gas are lost due to leakage.

Another factor influencing the loss through leaks in gas distribution is the increased pressure being introduced in the transmission of gas. Natural gas is used quite extensively for industrial purposes, and is piped long distances under high pressure. In addition the increasing consumer demands on existing net-works is compelling the use of higher distribution pressures in cities because of the prohibitive cost of rebuilding old lines or laying new lines to increase their size to meet the increasing loads due to expansion of cities and the increasing use of gas appliances for household heating, refrigeration and other purposes. Under such conditions it has been found in practice, that pipe provided with ordinary bell and spigot joints, suitable for low pressure distribution of manufactured gas develop serious leaks as the pressures are increased.

Another reason why these pipe lines suffer leakage is that thermal expansion and contraction of the pipe is not taken care of in some instances by suitable joints, but is imposed upon each bell and spigot joint, which produces relative movement and increases the possibilities of serious leaks under the higher modern distribution pressures.

In some installations where vibrations are transmitted to the pipes, it is difficult to keep the joints from developing leaks, even though the pressure carried thereby is relatively low.

A further wide field for such devices exists in modern pipe lines for the pumping of oils, gasoline, and the like over long distances and at high pressures, in preventing loss through leakage at the joints.

Devices have been heretofore proposed for the purpose of preventing such pipe joint leakage, but many of them have not, due to their nature, gone into use at all, and those that have gone into use, have been more or less unsatisfactory from the standpoint of cost or effectiveness, or both. While some of the prior devices have been fairly satisfactory for a time, it has been found in practice that expansion and contraction of the pipe and consequent slippage of the pipe sections with respect to each other has caused them to lose most of their effectiveness.

To repair a pipe line that has developed leaks, the most desirable procedure is to excavate the surrounding earth in the region of each pipe joint, and to apply a leak preventing device to each joint without disassembling the pipes. Some of the prior devices, however, are of such structure that they cannot be applied to the pipe line without disassembling the pipe sections, which necessitates cutting off the flow of gas, and requires the entire line being repaired to be out of service for a long period of time, and increases the installation costs materially.

Another disadvantage inherent with certain of the devices that have been heretofore proposed, is their lack of adjustability, their design being such that they fit a certain diameter pipe only, requiring different sizes to fit different sizes of pipe encountered in practice, with consequent loss of time in selecting and fitting the different sized joints. With such devices the workmen in the field commonly resort to various expedients to make the device fit the pipe, one of which consists in cutting away part of the metal, which results in the weakening of the structure and consequent failure under the loads imposed thereon in practice.

In some of the devices heretofore proposed, ordinary grades of rubber have been employed as a gasket material. In practice, however, it has been found that various constituents of the gas attack the rubber from the inside and cause rapid deterioration, causing the efficiency of the joints to rapidly decrease until the joint again begins to leak materially. It was also found that air, and the moisture contained therein, act upon the exterior of such gaskets, and causes rapid oxidation thereof with consequent loss in efficiency and leakage of the joint.

In the rubber gaskets heretofore employed in the prior devices it has been found that due to their design the material thereof flows in such a manner, when pressure is applied thereto, that they do not form a perfect seal. The prior gaskets that do form a fairly good seal upon initial clamping, rapidly lost their sealing properties after a short period of time, due to creeping of portions of the gasket.

Another material disadvantage in leak clamps heretofore proposed is their relatively high cost. Obviously if a pipe line is to be equipped throughout with leak preventing devices at each joint, the cost of these devices becomes a material item.

Accordingly it is a primary object of the present invention to provide an improved device for application to pipe joints that will form an effective seal against the leakage of any fluids therethrough and at the same time will retain its effectiveness over a long period of time.

Another object of the present invention is to provide a device of the character mentioned that will retain its effectiveness even though the pipe sections move substantially relative to each other after installation either longitudinally, in response to temperature changes, or angularly, in response to settling of the earth in which they are embedded.

A further object of my present invention is to provide a novel and highly efficient leak clamp that may be applied to pipe lines at comparatively low cost without disassembling the sections thereof, or disturbing the present joints.

Another object of the present invention is to provide a leak clamp or pipe joint seal, each element of which is so designed, that it is adjustable to allow for any ordinary dimensional variation at any pipe joint and at the same time producing a device that is sufficiently strong to withstand any stresses that may be met in pipe line installations.

A further object of the present invention is to provide a gasket for use in leak clamps that will safely resist any deteriorating effects of the gas or fluid passing through the pipe, and will furthermore effectively resist oxidation from atmospheric contact.

A still further object of my invention is to provide a gasket and a clamping member therefor that are each so designed that when pressure is applied to the gasket, the rubber will flow in such a manner as to produce a very effective joint, which will retain its effectiveness for a long period of time.

Another object is to provide a clamping actuating means for leak clamps that will force the gasket not only in a direction axially of the pipe, but in a direction radially thereof in addition thereto.

A further object of the present invention is to provide a device of the character above mentioned that can be made at a sufficiently low cost to permit profitable installation in pipe lines that have developed leaks.

Other objects of the present invention will appear hereinafter as the description thereof proceeds in connection with the accompanying drawings, and are defined by the appended claims.

As shown in the drawings:

Figure 1 is a view in perspective of two sections of pipe having one form of my improved leak clamp applied thereto.

Figure 2 is a longitudinal section through the pipe sections and part of the clamp shown in Figure 1 illustrating the association of the parts with the pipe sections.

Figure 3 is a detail view of a portion of each of the pressure rings of the form of invention illustrated in Figure 1 showing their overlapping relationship.

Figure 4 is a view showing the association of one of the pressure ring dogs and the pressure rings before pressure has been applied thereto.

Figure 5 is an enlarged front view of one of the pressure ring dogs, showing its cooperation with one of the pressure ring lugs.

Figure 6 is an enlarged detail view in section, of the gasket employed in my device, showing the cut provided therein and the pressure ring in light contact therewith.

Figure 7 is a view similar to Figure 4, however, showing the parts in the positions that they assume after pressure has been applied to the dog.

Figure 8 is a transverse section through a pipe which is provided with a modified type of leak clamp.

Figure 9 is a detail sectional view similar to Figure 2 showing the association of the parts of a modified clamp with the pipe sections.

Figure 10 is a front elevation of the anchor ring employed in this form of my invention.

Figure 11 is a section taken longitudinally of a different type of pipe joint showing my device applied thereto, and Figures 12 and 13 are sectional views of modified forms of gaskets which are adapted to be used with my device.

With continued reference to the drawings, wherein like reference characters designate like parts throughout the several views thereof, pipe section 1 is provided with a spigot 2 associated with bell 3 of pipe section 4. The pipe sections are united in well known manner by lead 5 or other jointing material which has been poured or placed in the annular space between the spigot and bell.

Closely disposed about bell 3 of pipe 4 is a ring member, which I term an anchor ring, and which comprises semi-circular sections 6 and 7. These sections do not individually encompass one hundred and eighty degrees, but the ends thereof are spaced apart, when applied to the pipe, as shown in Figure 1 of the drawings, for a purpose that will presently appear. Mounted on each end of each of these sections is a lug member 8 which is apertured at 9 and receives a bolt 10 which has a suitable nut 11 threaded thereon for the purpose of drawing two adjacent lugs together and thus firmly clamping the anchor ring sections closely about the pipe. Each anchor ring section is provided with a cylindrical face 12, which, in operation firmly grips the circumferential face of the bell, and a flange or skirt portion 13 is formed on each anchor ring section engaging back of the bell for preventing forward movement of the anchor ring over the end thereof. Disposed about the periphery of the anchor ring, at suitable intervals, are suitably apertured lugs 14 which, by means of bolts 36 and dogs 26 cooperate with the pressure rings presently to be described.

Disposed on the inner peripheral face 12 of the anchor ring sections as well as on the face of the anchor ring skirt 13 are short base members 15 which are located in the region of the lug members for the purpose of strengthening the ring in the region of the lug members and at the same time obviating any difficulty in installation due to slight irregularities or projections on the pipe, by restricting the contact of the ring with the pipe to small areas.

From the structure so far developed, it will be seen that all that is necessary to do, when it is desired to apply the anchor ring to the pipe, is to fit the two anchor ring sections about the bell of the pipe, insert the bolts 10 through lugs 8 and draw up nuts 11 and the ring will be very firmly secured in place.

In this connection it will be noted that the space that exists between the extremities of the anchor rings will compensate for dimensional variations in the bell of the pipe by drawing the two sections together the necessary distance to properly clamp the ring on the pipe.

Disposed about the periphery of the pipe, adjacent the joint thereof, is a rubber gasket 16 which has a cylindrical face 17 and a radial face 18. These faces cooperate with the pipe sections to seal the joint in the manner clearly shown in Figure 2. While a plain rubber gasket may be effectively used, I prefer to further provide the gasket with fabric facings 19 and 20, which serve to protect the rubber from exposure to gases and liquids, and at the same time reenforce the gasket and prevent any undesirable creeping or flowing of the rubber, as will be presently pointed out. These fabric facings are disposed in the region of the gasket that is exposed to the atmosphere, and they may comprise any suitable material such as cotton duck and the like. The gasket, after molding or forming, and before or after the facings have been applied thereto, is cut at an angle of approximately 30° to the plane of the gasket, as clearly shown in Figure 6, so that the gasket may be brought around the barrel of the pipe in operative position. By providing the gasket with a cut of this nature it has been found, that when the pressure ring has been brought into clamping engagement with it, the two faces of the cut gasket engage each other in such a sealing manner that no fluid is permitted to pass between them.

The material of which the gasket is composed may consist of any compounded rubber that has the particular resistant properties that are required in the particular installation, and at the same time possesses flow characteristics and ability to conform so that it may respond to the pressure ring in the proper manner to cause it to seal the joint. Obviously the particular kind of gasket material required will largely depend upon the nature of the pipe line that is to be sealed, that is the particular kind of fluid handled by the pipe line, and the nature of the medium surrounding the pipe will be essential factors in determining the nature of the material to be used.

The means that are employed to firmly clamp the gasket up against the joint comprises a pressure ring 22. This ring is made up of sections in a similar manner to that of the anchor ring. The pressure ring sections are provided with recessed portions 23 whereby they may overlap each other, and they have formed thereon a curved gasket engaging face 24 which is adapted to engage a curved face 25 of the gasket, to clamp the gasket in sealing relation with the joint. As shown in Figure 6 the radius of the face 24 is different than that of face 25 so that in cross section and when not under pressure, the space between the curved faces constitutes a crescent, approaching a segment depending on the relative curvature of the face 25 of the gasket and the face 24 of the follower.

The pressure ring sections are held in assembled relation by the same means that is employed to force the ring against the gasket, which will now be described. Pressure ring dogs 26 are provided with apertures 27 which may be of any desired configuration, which, however, are preferably square for the purpose pointed out in connection with the apertured anchor ring lugs, and are further provided with lug receiving apertures 28. Defining a portion of two walls of the openings 28, are cam faces 29. Two of these dogs are employed to hold the pressure ring in assembled relation with the pipe and each other, and perform this result in the following manner. Each pressure ring at each extremity thereof is provided with a lug 31 having a cam face 32 formed thereon, which cam face cooperates with the cam faces 29 on the dog 26. Formed on each pressure ring section intermediate its ends is a lug 33, which lug, however, differs from the lug 31 in that it has no cam faces formed thereon and is adapted to sit fairly loosely between cam faces 29 of the dog 26. In larger pipe clamps more than one intermediate lug may be employed and the rings may consist of more sections than are shown. Formed on the face of the pressure ring adjacent each lug 31 and 33, are cam shoulders or fulcrum points 34 which cooperate with cam faces 35 formed on the dogs 26 in a manner presently to be described. Formed on the pressure ring and contiguous with the lugs 33 are bosses 33' which serve to center the dogs 26 with respect to the lugs.

Referring now to Figure 4 of the drawings, the pressure ring dog 26 is shown in the position it takes, with respect to the pressure ring lugs before pressure has been applied thereto. It will be noted that the lugs 31 on the respective pressure ring sections are spaced apart and that the cam faces on the lugs 31 are out of contact with the cam faces 29 of the dog 26.

Bolts 36 are at this time inserted through the apertures 27 of the pressure ring clamping dogs and the apertures in the anchor ring lugs. A nut 37 is threaded on the bolt, and when taken up draws the parts together, at which time the pressure ring sections and the pressure ring dogs are disposed substantially in the position shown in Figure 7, in which figure it is obvious that the pressure ring lugs 31 are closely adjacent each other, their present disposition being caused by the wedging action of the cam faces 29 of the pressure dogs cooperating with the cam faces 32 of the pressure ring lugs 31. In this connection it will be noted that when the pressure ring sections are brought to bear firmly upon the gasket, the spacing of the lugs 31, and hence the disposition of the dogs, will depend largely upon the dimensional variations of the pipe and the character of the surface thereof. When the tightening operation is taking place all bending tendencies of the bolt adjacent the heads thereof are avoided by means of the rounded shoulders 38 and 39 formed on the pressure and anchor rings respectively. The bolts 36 fit rather loosely in the pressure ring dogs and anchor ring lugs so that the assembly has a certain degree of flexibility to allow for various installation conditions, such as angular disposition of the pipe sections etc.

Figures 2 and 7 disclose the parts in the positions that they assume when the initial tightening operation has been completed, that is, the nut 37 has been taken up on bolt 36 just sufficiently to cause the pressure ring sections to be brought together in light clamping engagement with the gasket. During this initial tightening operation the gasket has undergone an initial compression which will now be described. As stated above, the radius of the curved face 25 of the gasket is different than that of the curved face 25 of the pressure ring. As a result of this difference in radii, the initial tightening operation will bring the pressure ring into the position shown in Figure 2 where the initial deformation of the gasket occurs at its shoulders. These shoulders, being more easily deformed than the heavier central section of the gasket, are at once driven tightly against the pipe wall and the end of the bell. Any flow of the rubber that does occur at this time does so in the direction of the central portion of the gasket, and partially fills the space enclosed by the two curved faces 24 and 25. This operation has been described as taking place concurrently with the pressure ring dog tightening operation. However, this is only true for the major portion of each operation, since they overlap to a greater or less extent, depending upon the particular installation conditions encountered.

The initial tightening operation with particular reference to the functions of the cam faces on the pressure ring and pressure ring dogs will now be given. The inclination of the cam face 35 on the pressure ring dog, by bearing on fulcrum 34 of the pressure rings causes the dog to move upwardly in a substantially vertical direction, as pressure is applied thereto in a direction parallel to the bolt 36. This upward movement causes the cam faces 29 to wedgingly force the lugs 31 toward each other, thus clamping the pressure ring sections firmly about the gasket, and at the same time compressing the gasket slightly in a direction longitudinally of the pipe axis. As the initial tightening operation is taking place it is preferable to simultaneously tighten the pressure ring dogs that are disposed intermediate of the pressure ring sections to make the application of pressure more uniform, although it is not absolutely necessary that this be done.

The final operation is then effected by tightening all of the pressure ring dog nuts. As this operation is taking place it will be obvious, that due to the non-conformity of the pressure ring and gasket faces, the gasket is forced into radial compression as well as in a longitudinal direction. The results of these two actions cause the gasket to be forced toward the pipe joint as distinguished from the solely longitudinal compression of the gasket effected by clamps heretofore proposed.

The compressing action upon the gasket that has occurred during this final tightening operation will now be described. It will be remembered, that at the beginning of the final tightening operation, the shoulders of the gasket were under compression. As the pressure ring is brought into further clamping engagement therewith, the shoulders are further compressed and then the entire face of the pressure ring is brought into engagemen' with the gasket. Flow of the rubber out of t' spaces between the pressure ring and the pipe is effectively prevented by the pressure ring flanges which contact the gasket edges especially when taken in connection with the high compression existing in the rubber adjacent the shoulders at this time.

The operation that has just been described is true when rubber gaskets are employed that do not have any reenforcing elements in combination with them, however, when gaskets are employed that have cords moulded into their edges or are fabric faced, such reenforcing elements when taken in connection with the high compression existing in the shoulders positively prevents any improper flow of the rubber.

Thus it is seen, that the only direction in which the rubber can flow, is into any cracks that exist between the joint metal and the bell and barrel of the pipe, which is the desirable function sought. This produces a perfect seal which effectively prevents the leakage of any fluids from the joint.

It will therefore be seen that the fabric facings, when installed as a part of the gasket structure, perform a double function since they protect the rubber from injurious effects from the medium surrounding the pipe, and at the same time constitute inhibiting means for preventing improper flow of the gasket when pressure is applied thereto.

In Figures 8, 9, and 10 I have disclosed a modified form of leak clamp which also gives very good results in practice. Pipe sections 1 and 4 are joined in the same manner as the pipes shown in Figure 1 and will not be further described. The segmental anchor ring 41 is identical in structure as the anchor ring disclosed in the first modification except for the fact that the lugs 42, as well as the lugs 43, thereof are inclined rearwardly from the vertical, for a purpose that will presently appear. The sections of the anchor ring are secured together by means of bolts 44 passing through apertures 45 in lugs 43 provided thereon.

A gasket 47, fitting around the pipe cooperates with the joint to prevent leakage thereof, and is constructed in the same manner as the gasket disclosed in Figure 1. The curved face 48 of the gasket cooperates wtih the curved face 49 of the pressure ring 51, the radius of the face of the gasket being less than that of the curved face of the pressure ring, as shown in Figure 9. The sections of the pressure ring are joined together in a manner permitting a limited slidable motion with respect to each other by means of lugs 52 formed on the pressure ring sections near the ends thereof, and are so disposed as to overlap the lugs formed on the adjacent ring sections. Each lug 52 is slotted at 53. When the pressure ring sections are in assembled position on the pipe, a bolt 54 is passed through the aligned slots 53, and a nut 55 is threaded thereon and turned up to lightly clamp the lugs together. This permits the pressure ring sections to move toward and away from each other a slight extent by virtue of movement of the bolts in the slots, but restrains them from movement in any other direction.

Disposed about the periphery of the pressure ring, at appropriate intervals, are formed pairs of spaced lugs 58 which have hook portions 59 formed thereon. The surface of the rings between each pair of lugs is provided with a cam face 61. Cooperating with the hooked lugs 58, and the cam face 61 of the pressure rings, are pressure ring dogs 65, which have T-shaped members 66, formed at one end thereof, and are aperture at 67 at the other end thereof. The T-shaped extremity is disposed under each pair of adjacent lugs as shown in Figure 9. A fulcrum or bearing face 68 is formed on the under side of each pressure dog which is adapted to cooperate with the cam faces 61 of the pressure ring. The front face of the pressure ring dog in the region of the apertures 67 is given a spherical configuration, and the aperture is tapered as clearly shown at 71 for a purpose that will presently appear. A bolt 72 is passed through the aperture 67 formed in the pressure dogs, and through the anchor ring lugs, and a nut 73 is turned thereon.

The operation of the device just described is as follows. The anchor ring sections are fitted about the pipe and their securing bolts firmly drawn up to firmly clamp the anchor ring about the pipe bell. The pressure ring sections are each fitted about the pipe and joined together by means of the bolts cooperating therewith. The nuts 55 are threaded on the bolts 54 and are drawn up until the pressure ring lugs 52 are only in light clamping engagement with each other, so that they may slide upon each other in response to pressure. The pressure ring dogs 65 are then applied to the device and the bolts 72 passed therethrough and through the apertures in the anchor ring lug 42. The nuts 73 are threaded on the bolts 72 and lightly drawn up. At this time the parts will take the position as shown in Figure 9 of the drawings. At this point attention is called to the fact that the T-shaped extremity of the dogs is of such a dimension as to fit loosely between the hook 59 of the pressure ring lugs and the pressure ring surface, such construction avoiding any turning moment to be imposed upon the pressure ring by a slight rotation of the upper end of the pressure ring dogs 65 about the T-shaped extremity as an axis. The nuts 73 are then taken up and during the first part of this operation the dogs will rotate until the tapered portions 71 thereof are in firm contact with the bolts 72. As the nuts 73 are further taken up, the cam face 68 of the dog, which is disposed at approximately 45° to the pipe axis, firmly engages the bearing face 61 of the pressure rings and as a result of the movement of the cam face 68 in a direction parallel to the axis of the bolt, it exerts a force on the pressure ring, and consequently the gasket, at an angle of approximately 45° to the axis of the pipe. This resultant direction of application of force is very desirable in this construction in that it tends to force the gasket directly into the joint that is to be sealed, as above pointed out in connection with the first form of clamp. In this connection it will be noted that if the pressure ring 51 was rigid, or if the sections thereof were firmly bolted together, such components of force would not be obtained, since application of force in this direction would only force the ring in a direction longitudinal of the pipe, that is, the longitudinal component of force only would be asserted, and if further force were brought to bear upon the ring it would only serve to distort it and in fact no force could be brought to bear upon the ring that would produce the desirable results above mentioned. However, due to the sliding joints between the two pressure ring sections, each portion of the pressure ring is allowed to move, not only in a direction longitudinally of the pipe, but in a direction radially thereof, so that the resultant force is approximately at 45° which is the desired resultant force.

The sole function of the T-shaped extremity of the dog is to prevent the dog from riding up and out of contact with the pressure ring due to the upward camming action of the faces 61 and 68.

As explained in connection with the first modification, the initial clamping action serves to tightly compress the shoulder portions of the gasket, and at the same time a slight flow of the rubber occurs toward the central part of the gasket. The ring is then drawn into final clamping position, and during this operation flow of the rubber outwardly from the ring is prevented by the pressure ring flanges and the high compression existing in the shoulders at this time. When the pressure ring has been brought into its final position, by tightening the nuts 73, the nuts 55 may then be drawn up to firmly clamp the sections of the pressure ring together, which will assist the pressure ring dogs in securely holding the pressure rings in the position they have assumed as a result of the radial component of force that was applied thereto. While it is preferable to clamp the rings at this time by the tightening operation just described, it is to be understood that this operation is not absolutely necessary, that is, the pressure ring sections may be loosely held together by any other suitable means, and not tightened at all, since the pressure ring dogs have ample strength to permanently hold the rings in operative position on the pipe.

In Figures 8 and 9 I have shown the pressure ring lug 58 as being provided with a bore 75, which aligns with a similar bore 77 formed in the pressure ring dogs 65. Since the structure is identical in each case, I have only shown one of the lug assemblies as being so provided in Figure 8, and will only describe one of them. A wire 77', of substantially smaller diameter than that of the apertures 75 and 76, is passed through the apertures. The ends of the wire are then brought together and twisted, as at 78, thereby holding the lugs and dogs in loosely assembled relation. This provides a simple device for holding the part in assembled relation during shipment, etc., and yet, due to the loose character of the connection, it does not impair the correct camming action of the parts during installation on the job. In fact the wires may be cut and discarded at this time since their sole purpose has then been accomplished.

It will be understood that the twisted wire dog retaining means could be replaced by a bolt and nut or any other fastening means and it would function in the same manner. Moreover, it will be understood that the form of leak clamp shown in Figures 1 to 7 of the drawings may likewise be provided with this means for holding the parts in assembled relationship until they are applied to the pipe line. However, in providing this embodiment of my invention with the part retaining means just described, it will be noted that the pressure ring sections, in addition to the pressure ring dogs, will be held in assembled relation, and each assembly will form a complete pressure application unit. When installing this unit, the twisted wire, or other retaining means, will be removed just prior to fitting the sections about the pipe, thus assuring correct assembly of the parts with respect to each other, and preventing any possibility of loss of parts during shipment, handling etc.

It will be seen that the leak clamps that I have provided for stopping leaks in pipe lines are very effective, can be installed on a pipe line without disconnecting the pipe sections or disturbing the joint in any manner whatsoever, and consist of relatively simple structures.

In Figure 11 I have disclosed the form of leak clamp shown in Figures 1 to 7 of the drawings slightly modified and applied to a pipe employing joints of a different character. The pipe sections 81 and 82 are threaded into a collar 83. This sort of joint presents a source of leakage on each side of collar 83, and accordingly a pressure ring and gasket assembly is disposed on either side of the collar. Since the construction of the pressure rings and clamping dogs is identical with that disclosed in the first modification above mentioned they will not be described. In this connection it will be noted that no anchor rings are necessary since the pressure rings, in reacting against each other, constitute anchor rings.

The gasket 84 is provided with a circumferential face 85, and a curved face 86, which conforms generally in configuration to the curved end 87 of the collar 83. While the configuration of the co-operating gasket and pressure ring faces may be like that disclosed in the previous modifications, I have shown them as being curved outwardly in the present device to illustrate the fact that good sealing effects can be obtained by using either form.

The gasket is provided with a convex face 88 which terminates at each edge of the gasket in a flat portion 89 that is substantially parallel to the surface against which that region of the gasket bears. The pressure ring 91 is provided with a curved face 92, which, however, is of shorter radius than that of the gasket face 88. The face 92 terminates in flat portions 93 that are adapted to contact the flat portions 89 of the gasket. The gasket is provided with fabric facings 94, of a similar character to those employed in the previous modifications above described, differing however in extent as clearly shown in Figure 11.

The operation of this device is precisely the same as that outlined in connection with the first form of the invention and will not be repeated here. However, it will be pointed out that the resultant force acting upon the gasket in a direction at 45° with the pipe axis is particularly important. The prior devices proposed for this use only exert a force longitudinally of the pipe and have strong tendency to cause the gasket to ride up over the shoulder of the collar and away from the joint to be sealed. In the present device, however, the gasket is positively forced in towards the pipe as well as longitudinally thereof, and the above mentioned difficulty is entirely obviated.

The deformation and flow of the gasket during the tightening operation is substantially the same as that previously described in connection with the other forms of the present invention. During the initial operation the faces 89 and 93 contact and are compressed, and any flow of rubber that takes place at this time does so in that direction toward the center of the gasket to partially fill the spaces defined by the faces 88 and 92. As the final tightening operation takes place the edges of the gasket are further compressed and the faces 88 and 92 contact and the entire gasket is under compression and the rubber is then caused to flow into the joint, since the fabric facings in combination with the state of high compression existing in the shoulders at that time effectively prevents any flow of rubber outwardly of the pressure ring.

In Figures 12 and 13 I have disclosed modified forms of gaskets that may be used in connection with all of the forms of clamping devices that have been disclosed. Referring to Figure 12, a gasket 101 is shown, which is of the same external configuration as that shown in Figure 6. Moulded in the gasket body, near the surface thereof, are cords 102, which reenforce the gasket and prevent undue flow of the rubber in the manner set forth in connection with the form of gasket shown in Figure 6.

In Figure 13 there is shown a gasket 103 which has the same configuration as those previously described and which is formed of a relatively hard rubber. The pipe barrel and bell engaging portions of this gasket are provided with relatively soft rubber faces 104. The soft character of these faces allows the gasket to be intimately engaged with the pipe surfaces and minute cracks may be effectively sealed. In this connection it is to be understood, that the soft rubber facing may be used in connection with the fabric-faced, or cord-embedded type of gaskets that have been above shown and described.

It will be understood, in connection with all of the forms of devices disclosed, that the pressure ring may consist of more than two segments, in fact, in using these devices in connection with large size pipe, it would probably be preferable to employ a pressure ring consisting of three or four or even six segments, in order to insure equal distribution of pressure upon the gasket.

In connection with the gasket and clamping member therefor, that I have disclosed, it will become apparent, after an analysis of the operation thereof, that it has a wide field of application aside from use with pipe lines. My improved gasket and clamping member, can, for example, be made so as to have a straight instead of a curved configuration and used to seal the joints between plane surfaces. In such a construction the actuating means for the clamping member could be associated with one or both of the plane surfaces.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having now particularly described my invention, what I claim and desire to secure by United States Letters Patent is:—

1. A device for sealing the joint between a pair of meeting surfaces substantially normal to one another comprising a packing member having a face conforming substantially to the configuration of said surfaces; a relatively rigid clamping member provided with a packing engaging face adapted to engage said packing member adjacent its edges, and means for compressing said clamping member against said packing member in a progressively increasing area of contact and with a corresponding progressive increase in pressure on the portions of area as successively contacted.

2. In a device for sealing the joint between a pair of meeting surfaces, a packing member disposed against said joint, a clamping member for forcing said packing member in sealing engagement with said surfaces, said packing member and said clamping member being provided with cooperating faces forming a space therebetween of increasing width towards the center of said faces when said clamping member is not under pressure and means for compressing said clamping member against said packing and toward said joint.

3. In a device for sealing joints, a deformable sealing member associated with said joint, a clamping device associated with said deformable member and adapted to force the same toward said joint, said sealing member and clamping device being provided with cooperating, dissimilarly curved faces, whereby, as said clamping device is forced against said sealing member said faces will be brought into progressively increasing surface contact, said faces being so related as to cause said surface contact to progress from the edges of said sealing member towards the central portion thereof and to cause a corresponding progressive increase in pressure on the portions of area as successively contacted whereby improper flow of said sealing member is prevented.

4. In a pipe assembly employing joints providing a lateral face, a gasket disposed about said pipe and abutting said face, a segmental pressure ring abutting said gasket and having sliding connections between its segments, means bearing upon said pressure ring and urging it in a direction substantially at 45° of the pipe axis, said sliding connections permitting all points of said ring to move in the direction in which they are urged by said means.

5. In a pipe assembly having a joint and a gasket associated with said joint, a segmental pressure ring engaging said gasket and common means urging the segments of said pressure ring in a direction to decrease its circumference and simultaneouly urge said pressure ring in a direction parallel to said pipe.

6. In a leak clamp, a segmental anchor ring, said segments being provided with apertured lugs on the outer peripheral face thereof and having an inner peripheral pipe engaging face, said inner peripheral face having short base members thereon in the region of said lugs, whereby, said bases reenforce said segments against deformation through pressure applied to said lugs and contact of said ring with a pipe is limited to small areas.

7. In a leak clamp, a pressure ring having cam faces and lugs provided thereon, camming dogs adapted to cooperate with said lugs and cam faces, and means for connecting said lugs and dogs and providing lost motion therebetween, whereby said lugs and dogs are held in assembled relation during handling thereof and said lost motion connection permits said cam members to function properly during installation.

8. In a joint sealing device, an anchor ring comprising a plurality of segments and having a substantially cylindrical internal surface with projecting pads thereon for engaging the cylindrical face of a pipe bell, a substantially radial inwardly projecting member on said ring for engagement with the shoulder of the bell, and means for adjustably securing the ends of the segments together and for clamping the ring about the bell.

9. In a pipe joint sealing device, an anchor member, a gasket for engaging the pipe joint, and a follower for compressing said gasket, said follower comprising a plurality of arcuate sections having portions at the ends thereof with dog engaging faces, said portions being arranged to be adjustably spaced from one another, and a clamping dog having means to engage said faces to hold the ends of said sections at any of their adjusted positions.

10. In a joint sealing device, an anchor ring adapted to be clamped about a pipe bell, a gasket for engaging the pipe joint, and a follower ring for compressing said gasket, comprising a plurality of segments having lugs on the ends thereof, dogs adapted to engage said lugs for adjusting the spacing of the ends of the segments, means cooperating with said anchor ring and dogs to adjust the spacing of the ends of the segments and compress the gasket, and means intermediate the ends of said segments for compressing the gasket.

11. In a pipe joint sealing device, an anchor ring adapted to be clamped about a pipe bell, a gasket for engaging the pipe joint, and a follower ring for compressing said gasket comprising a plurality of segments having lugs on the ends thereof, dogs adapted to engage adjacent lugs of adjacent follower ring segments, adjustable means for securing said dogs to said anchor ring, separable clamping elements having hooked engagement with said clamping ring segments intermediate the ends thereof, and means for securing said clamping elements to said anchor ring.

12. In a pipe joint sealing device, a follower member comprising a plurality of arcuate sections one face of which is convex for engaging a gasket, and shoulders adjacent the edge of the convex face.

13. In a pipe joint sealing device, an anchor member, a sealing gasket having joint engaging faces and a generally concave face, a follower member having a similarly shaped convex gasket engaging face and retaining shoulders adjacent the gasket engaging face, and means for adjustably securing the follower member to the anchor member.

14. In a bell and spigot pipe joint sealing device, an anchor member adapted to engage the pipe bell, a gasket for engaging the pipe joint, a follower for compressing the gasket comprising a plurality of arcuate sections, means for adjustably securing the sections to the anchor member, and means for forcing said sections radially inwardly to compress said gasket.

15. In a leak clamp for a bell and spigot joint, a segmental anchor ring, said segments being provided with a radially outwardly projecting apertured portion, and having an inwardly extending skirt portion adapted to engage the shoulder of the bell, and a substantially cylindrical portion to engage the cylindrical surface of the bell, said skirt portion having short elevated base members thereon to reduce the area of contact thereof with said shoulder, and means for securing said segments together.

16. In a pipe joint sealing device, an anchor member, a gasket for engaging the pipe joint, and a follower for compressing said gasket, said follower comprising a plurality of annular segments each having a lug at the ends thereof and having a shoulder adjacent each lug, a dog adapted to cooperate with said lugs of adjacent segments to hold said segments in adjusted relation, said dogs having a cam shoulder engaging said segment shoulder, and means to secure said follower to said anchor member.

17. In a pipe joint sealing device, an anchor member, a gasket for engaging the pipe joint and a follower for compressing the gasket, said follower comprising a plurality of arcuate sections, means for adjustably securing the sections to the anchor member, and means for adjustably securing and spacing the ends of the adjacent segments, the adjacent ends of the segments being mated to provide an interlocked joint.

18. In a pipe joint sealing device, a gasket for engaging the pipe joint, a follower for compressing said gasket comprising a plurality of arcuate sections, lugs adjacent the ends of said sections, clamping dogs having means for cooperation with means on said sections to cause said dogs to move radially, and means on said dogs for cooperating with means on said lugs to draw the ends of said sections together during radial movement of said dogs.

19. In a device for sealing a bell and spigot pipe joint, a deformable sealing member having a compressor engaging face and a sealing surface, a compressor cooperating with said sealing member and engaging said face, said compressor comprising a plurality of arcuate sections, means to adjust the spacing of the ends of said sections to reduce the diameter of said compressor and compress said sealing member, and shoulders on the edges of the face-engaging portions of said sections to initially engage said sealing member to limit the tendency of the sealing member to flow between the clearance spaces between the compressor and the bell and spigot faces as the diameter of said compressor is reduced.

ELDON S. CLARK.